United States Patent [19]
Phillips

[11] 3,830,447
[45] Aug. 20, 1974

[54] ACTIVE NUTATION DAMPING IN DUAL-SPIN SPACECRAFT

[75] Inventor: Kevin John Phillips, Hightstown, N.J.

[73] Assignee: RCA Corporation, New York, N.Y.

[22] Filed: Sept. 28, 1972

[21] Appl. No.: 292,956

[52] U.S. Cl............ 244/1 SA, 235/150.27, 318/580
[51] Int. Cl.............................................. B64g 1/10
[58] Field of Search............ 244/1 SS, 1 SA, 77 SS; 235/150.2, 150.25, 150.27; 318/580, 584

[56] References Cited
UNITED STATES PATENTS

| | | | |
|---|---|---|---|
| 2,973,162 | 2/1961 | Haeussermann | 244/1 SA |
| 3,158,337 | 11/1964 | Lannan | 244/1 SA |
| 3,171,612 | 3/1965 | Hildebrant | 244/1 SA |
| 3,362,658 | 1/1968 | Ito et al. | 235/150.2 X |
| 3,442,468 | 5/1969 | Iorillo | 244/1 SA |
| 3,591,108 | 7/1971 | Perkel et al. | 244/1 SA |
| 3,641,323 | 2/1972 | Hughes et al. | 235/150.2 |

Primary Examiner—George E. A. Halvosa
Assistant Examiner—Barry L. Kelmachter
Attorney, Agent, or Firm—Edward J. Norton; Joseph D. Lazar

[57] ABSTRACT

A dual-spin spacecraft having a de-spun platform is arranged to vary or modulate the torque on the stabilizing member, such as a momentum wheel, by a motor whose speed is varied or modulated in accordance with a signal representing nutation motion to damp or attenutate the nutation motion substantially to zero very rapidly. The nutation motion is sensed by a suitable device such as a horizon sensor, a gyroscope, or an accelerometer. By arranging the mass distribution such that significant cross products of inertia exist, the effects of such products are utilized in a closed loop control system to effect the desired attenuation or damping. A phase shifting network is provided to shift the phase of the cyclic sensor output signal by a predetermined angle whereby optimum damping of the nutation motion is achieved.

6 Claims, 2 Drawing Figures

ACTIVE NUTATION DAMPING IN DUAL-SPIN SPACECRAFT

CROSS REFERENCE TO RELATED APPLICATION

This application is related to copending application Ser. No. 81,450, filed Oct. 16, 1970, now U.S. Pat. No. 3,695,554 entitled "Nutation Damping in Dual Spin Spacecraft" by Kevin John Phillips, assigned to the same assignee as this application.

BACKGROUND OF THE INVENTION

1. Field of the Invention

This invention relates to orbiting spacecraft, and more particularly to such spacecraft that have a rotating body which is spin stabilized, such spacecraft being of the class known as dual-spin spacecraft.

2. Description of the Prior Art

With the advent of the use of satellites as valuable tools for the compilation and transmission of data in the fields of communication, navigation, weather forecasting, and observation stations in general, it has been found that in conjunction with these varied and multiple uses a need exists to launch larger and larger satellites which can perform such multiple functions. In accordance with these developments there has also been a need to stabilize all satellites of any size within closer tolerances and greater accuracy than has been achievable in the past. In many applications it is desirable that the spacecraft be maintained in a predetermined orientation or attitude with respect to a given reference direction, such as the direction of the gravity vector, with high accuracy.

A particular type of satellite suitable for accurate stabilization with very small pointing errors is the dual-spin spacecraft which consists of a platform, the angular position of which is stabilized relative to the earth by the reaction torque generated by changes in speed of a motor-driven spinning member termed spinning drum, momentum wheel, attitude control wheel or stabilizing wheel. Such a wheel shall be designated herein a momentum wheel and the platform shall be referred to as the de-spun platform as such a portion is now commonly designated in the art.

Basically, a spin-stabilized satellite exhibits certain types of troublesome motions called wobble, precession, or nutation. All such motions tend to result in a displacement of the satellite's geometric axis from its intended mission orientation or attitude.

Nutation, the coning motion of the pitch or spin axis about the total angular momentum vector, may result from any of the following disturbances: (1) final stage booster nutation, (2) operation of the separation equipment, (3) operation of the attitude control and station keeping components, (4) bombardment by micrometeorites, and (5) operation of payload components with uncompensated momentum.

In general, and as to be used herein, nutation is rotational motion about either or both of the transverse (non-spinning) axes which causes a rotational coning motion of the pitch (spinning) axis about the total or resultant momentum vector of the spacecraft. The rate of the coning motion is termed the nutation frequency ($\omega_n$). The cone angle of such motion is the amplitude of the nutation which is a measure of the pointing error referred to above. In addition to nutation, the satellite may be rotated about the pitch axis relative to a reference plane or vector such as the gravity vector or the perpendicular to the earth's surface. Such a rotation is termed the pitch error designated $\theta_p$.

Nutational stability indicates the manner in which a satellite's stabilizing system controls or responds to nutational motions. In certain systems and under certain conditions nutation can increase after the original torque has been removed. In an undamped system, nutational motions will continue without increasing or decreasing. When the nutation decreases, it is said to be damped.

It is conventionally accepted that nutational stability is critically dependent on various parameters of a spacecraft including the moments of inertia, cross products of inertia, angular momentum, roll (or yaw) angle rotations, and the pitch servo loop system.

In conventional design procedures nutation may be reduced by energy absorbing or momentum transfer devices operable on either or both of the transverse control axes (the axes perpendicular to the pitch or spin axis) to attenuate nutation. Active dampers overcome nutation effects on the pitch axis by developing a torque of opposite phase to that of the nutation torque. Such active dampers may be in the form of propulsion jets or a spinning wheel in addition to the stabilizing wheel of the de-spun system such as disclosed in U.S. Pat. No. 3,591,108 issued July 6, 1971 to RCA Corp., based on the invention of Harold Perkel and William Comerford entitled "Control System for Spinning Bodies."

In conventional designs of dual-spin satellites, the axis of spin of the momentum wheel is selected to be colinear with one of the principal axes of the satellite, the principal axes being defined in this art as the axes about which the products of inertia vanish. In practice some cross products remain in spite of the most careful design and manufacture techniques. The effect of cross products of inertia is the production of a torque about an orthogonal axis relative to a disturbing torque by the coupling effect of the asymmetrical mass distribution. Thus, in a dual-spin spacecraft, any change in speed of the momentum wheel causes a nutation motion on the the momentum wheel, the amount of which depends on the cross products of inertia of the spacecraft and the amount of speed-changing torque applied to the wheel. Accordingly, good conventional design procedures of both the mass distribution of the satellite as well as the stabilizing control loop, dictate minimizing if not eliminating, the coupling effect into the spin axis of the cross products of inertia.

A system for effecting active nutation damping in a dual-spin spacecraft is described in copending application, Ser. No. 81,450, filed Oct. 16, 1970, entitled "Nutation Damping in Dual-Spin Spacecraft." The system described therein achieves nutation damping by utilizing cross products of inertia developed by arranging the spinning axis to be skewed to the principal axes of the spacecraft. Optimum damping can be achieved with such a spacecraft having a fixed geometry whereby the cross-products of inertia are fixed, by orienting its attitude sensor about the optimum sensor axis. Optimum nutation damping can be also achieved if the sensor axis cannot be altered by arranging the spacecraft geometry such that the maximum cross product of inertia exists between the pitch axis and a lateral transverse axis located so as to develop optimum nutation damping. The lateral axis when located to determine the maximum nutation damping effect is termed herein as the "optimum lateral axis."

In certain spacecraft, the design limitations are such as to prevent the utilization of either of the two techniques in said copending application. In particular, where the transverse axis of the sensor cannot be shifted and the spacecraft product of inertia cannot be changed, active damping techniques of said copending application cannot be used. It is desirable, therefore, to provide a means to achieve an optimum damping notwithstanding the constraints of an unalterable structural design of a spacecraft.

SUMMARY OF THE INVENTION

According to the invention an attitude stabilized dual-spin spacecraft is provided with a spinning member whose rotation is not parallel to a principal axis to thereby establish cross products of inertia between the spin axis and a lateral axis at right angles to the spin axis of the spinning member. A sensor randomly oriented relative to an otherwise optimum lateral axis for optimum control, responds to lateral motion about a lateral axis to develop a signal representative of the motion about that axis. A phase shifting device shifts the phase of the sensor signal by a predetermined optimum angle. A closed loop control circuit including a motor for spinning the member about the spin (pitch) axis is arranged to respond to the phase shifted signal and to vary the motor torque and thus the speed of the motor to attenuate or dampen by means of the lateral torques generated through the product of inertia the lateral nutational motion at substantially optimum rate towards zero at the same time as it controls the motion about the spin or pitch axis.

DETAILED DESCRIPTION OF A PREFERRED EMBODIMENT

Figure 1:
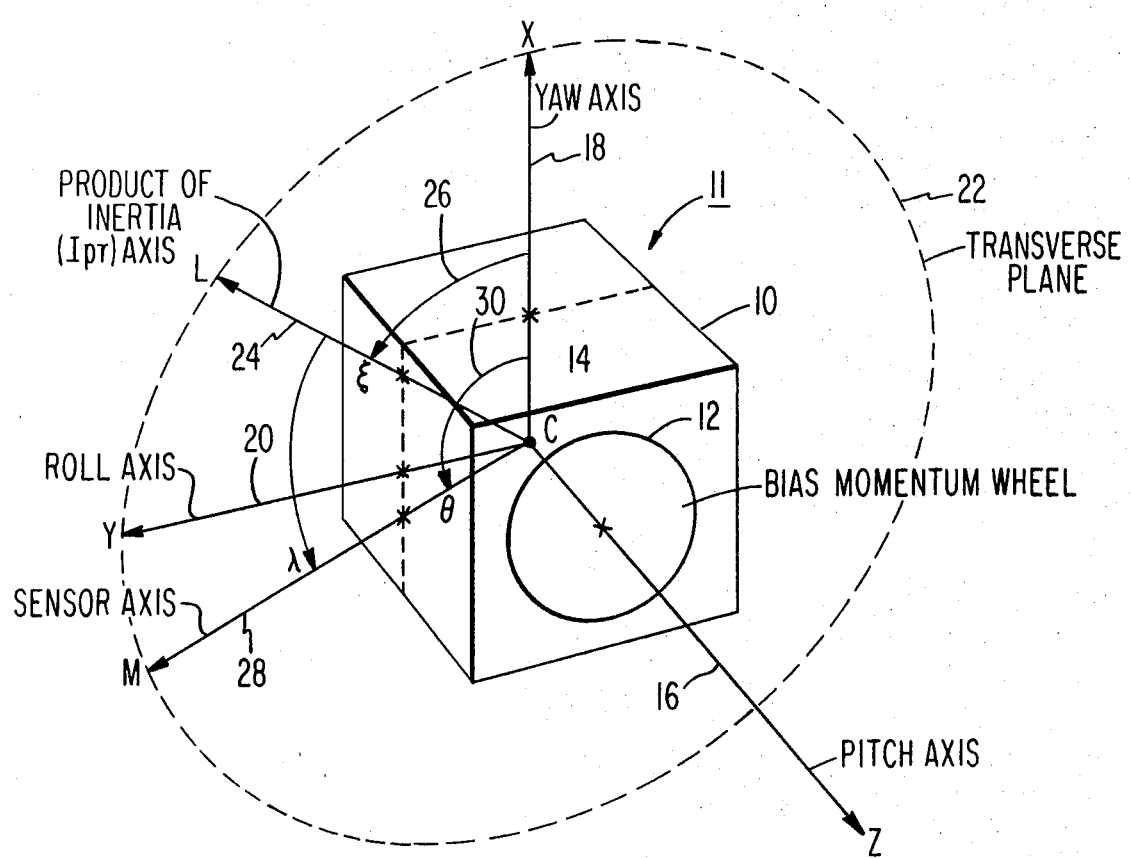
FIG. 1 is a diagram in perspective of a spacecraft showing the reference axes related to one embodiment of the invention.

According to the invention, a dual-spin spacecraft in which a platform usually, but not necessarily, carrying the system electronics is de-spun to an earth reference or inertial space reference, while a mass in the form of a flywheel or momentum wheel coupled to the platform is rotated at a substantially large angular velocity to provide stabilization about a selected axis of the spacecraft, preferably the pitch axis, colinear with the axis of the flywheel.

The mass distribution of the spacecraft is arranged so that cross products of inertia of the platform exist between at least one of the lateral axes and the pitch axis, the pitch axis being colinear with the axis of rotation of the momentum wheel. Thus, the pitch axis is not colinear with any of the principal axes of the spacecraft, it being understood that the principal axes define axes about which no cross products of inertia exist. The magnitude and polarity of the respective cross products of inertia are selected so that changes in torque and thus speed of the momentum wheel in response to a signal representing the nutation induce counter torques on the non-spinning axis to attenuate nutation.

The control signal is a signal output of a device sensing rotation about a lateral axis representative, thus, of the nutational motion. This signal is used to control the speed of the motor-driven flywheel rotating about the pitch axis. The motor is included in a closed-loop pitch axis control system, the gain and phase of which being selected to effect stability for all modes of operation and tolerances of the orbiting satellite including pitch error control.

In general, any or all of the three design parameters, i.e. (1) the cross products of inertia, (2) the signal representing motion about a lateral axis, and (3) the phase and gain of the closed-loop pitch axis control system at nutation frequency may be arranged to effect the nutation damping desired. However, for design convenience, it is advantageous to design a system by the selection of the cross products of inertia and the lateral-axis signal within a given closed-loop pitch control system.

According to the invention described in said copending application, the method of operating a satellite to effect nutation damping can be optimized by an analysis of the transfer function of the closed-loop system in terms of the three design parameters just mentioned above. However, for a given system made in accordance with the invention the cross products only may be varied to develop a wide range of different damping time constants, any of which can be useful even if not of optimum value.

Thus, for certain design needs, for example very rapid nutation damping, a satellite can be operative without any other devices of the conventional type heretofore used to control damping. However, for certain needs, a system utilizing this invention is compatible with such conventional damping devices and in such an arrangement may be considered a cooperative operation wherein the damping time of the damping device is improved by the nutation damping effected by the system of the invention.

According to the present invention, a spacecraft having design constraints that prevent an optimum orientation of the sensor or a change of the geometry to effect an optimumly located composite product of inertia may nevertheless be provided with the means to achieve effective optimum orientation of the sensor so as to achieve effectively the maximum nutation damping effect. This is achieved by providing a means to shift the electrical phase of such a non-optimumly oriented sensor signal by an angle such that the modified signal is equivalent to that generated by a sensor whose measurement axis is the optimum axis cooperating with the inherent cross products of inertia, whatever they may be in the given spacecraft design.

Before describing the embodiment of the present invention chosen to illustrate same, reference is made to FIG. 1, illustrating a spacecraft of the dual-spin type and the related axes to be referred to in the embodiment. The spacecraft body portion 10 is provided with a momentum bias wheel 12 decoupled from the body portion 10 by a shaft and bearing or the like, and driven by an electrical motor, not shown, mounted in the portion 10. It is to be understood that the spacecraft being described is one of several types well known in the art wherein the body portion 10 is substantially larger in mass than the bias member 12, and is arranged to house substantially all of the sensor equipment, control apparatus and the like needed for the mission. The bias member 12 is of relatively lesser mass and may carry on it the sensing equipment for attitude control, with a minimum amount of additional apparatus for mission use. It will be understood, however, that the spacecraft configuration may take on any suitable form utilizing the de-spun principle. Accordingly, a system utilizing the invention may comprise one in which the bias member 12 is the larger mass rotating at a relatively slower speed and the body portion 10 of smaller mass de-spun therefrom. The body serves as a platform for those instruments functioning for or requiring geostationary orientation, that is oriented so that its platform is in a fixed orientation relative to the earth whereby antenna, infrared sensors, telescopes and the like may be mounted and pointed in a stationary, fixed position relative to a chosen site on the earth's surface.

All the axes illustrated in FIG. 1, pass through the center of mass (C) 14 of the entire spacecraft, 11 (10 and 12). The pitch axis (z) 16 is the spin or momentum axis, the bias momentum wheel axis being in alignment with axis (z) as in conventional arrangements for such spacecraft. The yaw axis (x) 18 and the roll axis (y) 20, are termed the transverse axes and the plane formed by the x and y axes is termed the transverse plane 22. An infinite number of other axes could be drawn through the center of mass 14 that emanate radially in the transverse plane 22. Any such axis is also called a transverse or lateral axis.

Should the spacecraft 11, comprising the body portion 10 and the bias wheel 12, be nutating, any transverse axis will experience or exhibit an angular cyclic motion about such axis at the nutation frequency of the spacecraft. As known in the art, the nutation frequency is substantially fixed for a given spacecraft inertia distribution and momentum. The spacecraft of the dual-spin type, being a momentum-biased spacecraft, is usually operated with a substantially constant momentum. It will be understood that in certain modes of operating a spacecraft, the momentum of such spacecraft can be changed requiring an alternative design of a nutation damping system embodying this invention.

The phase difference between the cyclic motions of any two randomly selected axes in the transverse plane will be substantially equal to the angular difference between the two axes. Thus, for example, if the two transverse axes are the yaw axis 18 and roll axis 20, the phase difference between the cycle motion would be 90°, since these two axes are orthogonal.

As described in detail in said copending application, the attitude sensor, which detects angular motion about some axis (L) 24, in the transverse plane 22, which axis is inclined at an angle $\xi$ from the positive portion 18 of the x (yaw) axis in the direction of the positive portion of the y (roll) axis 20, as indicated by the arrow 26. The cross products of inertia, as more fully explained in said copending application, exist between the yaw/pitch and roll/pitch axes, are defined for the present description as $I_{xz}$ and $I_{yz}$, respectively. $I_{xz}$ and $I_{uz}$ can be expressed as a composite product of inertia $I_{pr}$, where:

$$I_{pr} = \sqrt{I_{xz}^2 + I_{yz}^2}$$

1

$I_{pr}$ exists in the plane defined by the z axis 16, and an axis (M) 28 in the transverse plane 22. Axis 28 is inclined at an angle $\theta$ from the positive x axis 18 in the direction of the positive y axis 20, as indicated by arrow 30. The angle $\theta$ can be expressed as having a value defined by the following relationship:

$$\theta = \arctan (I_{yz}/I_{xz})$$

2

The attitude sensor, not shown, but suitably mounted in the spacecraft on the bias wheel 12 or in the body portion 10, provides a signal proportional to the detected cyclic motion (nutation) to a pitch loop or bias wheel control loop, the sensor signal modulating the momentum motor torque at nutation frequency. Depending upon the angular difference $\lambda$, between $\theta$ and $\epsilon$ where:

$$\lambda = \theta - \xi$$

3 the torque can force the nutation angle to grow or decay.

If $\lambda$ is varied from 0° to 360°, there is one value of $\lambda$ namely, $\lambda_o$, which gives maximum nutation damping. As as described in said copending application, the optimum or maximum damping of nutation can be achieved in a spacecraft whose products of inertia are fixed, by positioning the sensor such that the sensor angle $\theta$ in conjunction with the fixed product of inertia angle (26) $\epsilon$ yields the optimum angular difference $\lambda_o$. For a spacecraft where the sensor angle $\theta$ (30) is fixed, the required optimum damping of nutation can be achieved by arranging the mass distribution of the spacecraft such that the composite produce of inertia ($I_{pr}$) angle $\epsilon$ (26) in conjunction with the fixed sensor angle $\theta$ (30), yields the optimum difference $\lambda_o$.

According to the present invention, assuming that nutation motion is being sensed by some existing or fixed transverse axis sensor whose sensing axis cannot be shifted or reoriented, and, assuming further that the products of inertia of the spacecraft are fixed and cannot be changed, optimum damping of nutation can be achieved by shifting the electrical phase of the sensor signal. The required amount of electrical phase shift is defined as the angular difference $\Delta$ where $\Delta$ is equal to $\lambda - \lambda_o$. The value of $\Delta$ may assume any value between 0° to 360°. It is preferable that the phase shift occurs at the nutation frequency using a filter or otherwise arranged to be nonresponsive to all other frequencies. However, since a spacecraft will nutate only at one frequency, the response characteristic of a suitable phase shifting device at frequencies other than the nutation frequency can be of no consequence to the damping function. Nevertheless, it is good design practice to ensure that the phase shift is substantially stable and does not vary significantly in the vicinity of the nutation frequency, so that the correct phase shift is still maintained within the system tolerances. In other words, the system must be stable. The stability of such a pitch loop is described in greater detail in said copending application. Providing with such stability allows for variations in the nutation frequency from the ideal or theoretical value due to momentum and inertia tolerances.

Figure 2:
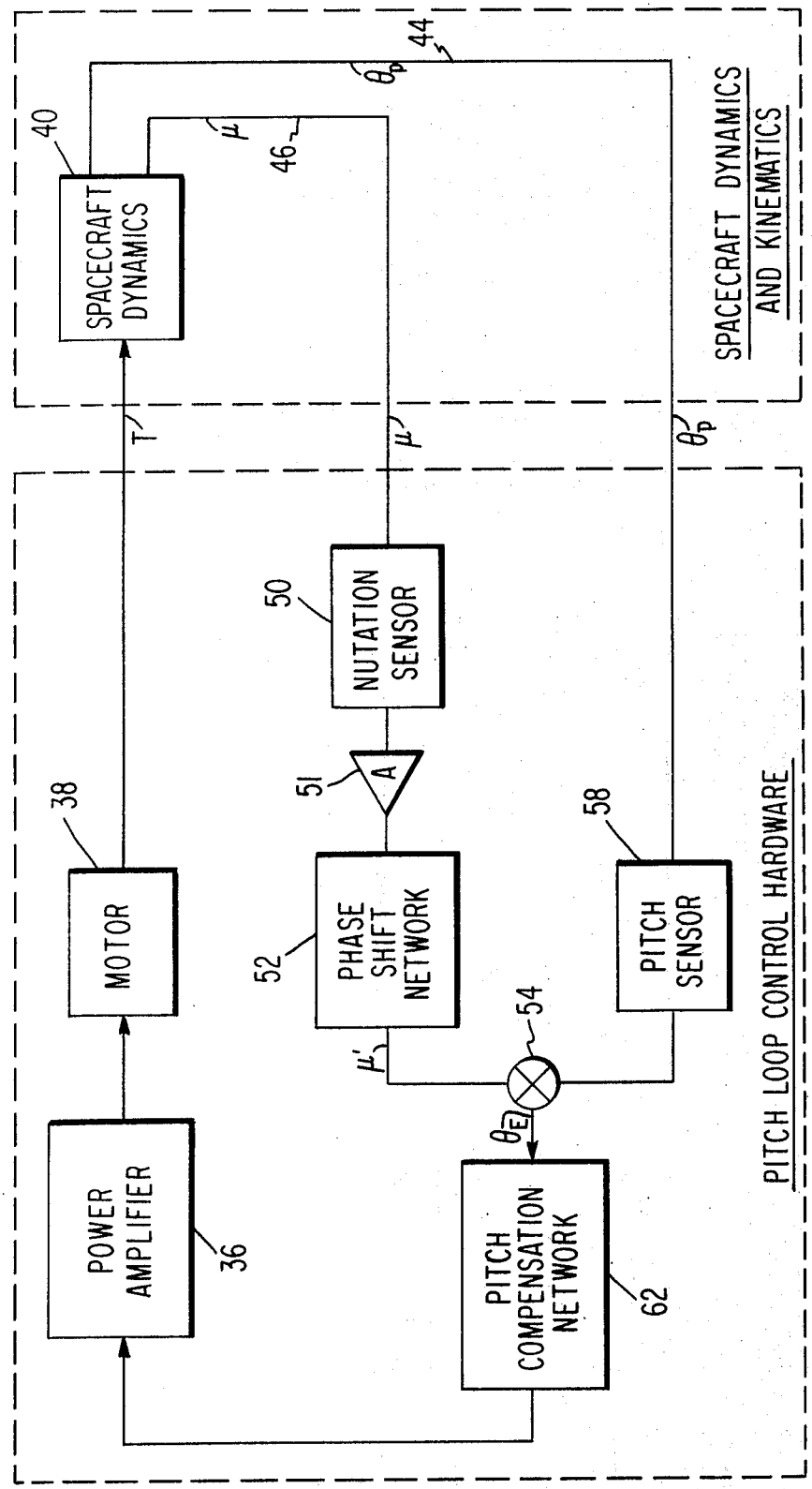
FIG. 2 is a block diagram of the pitch control loop of a spacecraft embodying the present invention.

A particular illustration of the pitch loop control coupled to the spacecraft dyanmics according to the invention is shown in FIG. 2.

The left hand portion 32 of the diagram illustrated in FIG. 2 represents the components of the nutation damping and pitch stabilization system comprising the pitch loop control hardware, while the right hand portion 34 of the diagram represents the dynamics and kinematics of the satellite and their functional relation in the control loop.

The motor torque T developed by any change in output voltage from power amplifier 36 will induce in the spacecraft angular motions about all of the three body axes ($x$, $y$, $z$). If there are no products of inertia between the spin axis 16 and the transverse axes 18 and 20, no transverse torques, and thus no motions will be induced about the transverse axes. However, with the existence of cross products of inertia, a torque T from motor 38 will induce a motion about the transverse axes 18 and 20 such as to attenuate any angular rotation that may have previously existed, such angular rotation being the nutation of the spacecraft.

The spacecraft dynamics shown as block 40 represents the spacecraft 11 (FIG. 1) in its orbiting state and, particularly, the cross products of inertia suitably selected, preferably, to induce the attenuation effect of the invention. However, as previously explained, the particular feature of the present invention is the provision of the phase shifting means within this pitch loop control to compensate effectively for any configuration of the spacecraft wherein the cross products of inertia are not such as to provide the optimum orientation or, indeed, such as not to induce attenuation of nutation. Any torque T developed by motor 38 will cause the pitch axis 16 to rotate by a certain angular rotation from a desired reference, this rotation being the pitch error $\theta_p$, as described in greater detail in said copending application.

The pitch error $\theta_p$ heretofore has been used as the only control parameter for the pitch loop. According to the present invention, the control parameter for the pitch loop is the combined sensed error $\theta_E$ which is the sum of pitch error $\theta_p$ and the nutation quantity $\mu'$, to be explained.

The component of the combined sensed error $\theta_E$ contributed by nutation motion is represented by $\mu$ (path 46) which may be the cyclic angular roll error due to nutation, the cyclic angular yaw error due to nutation, or the lateral motion about any transverse axis (L, 24) due to nutation. Alternatively, the component can be the measurement of the time derivative of the motions about these transverse axes, as explained in greater detail in said copending application. This (nutation) component is derived from the dynamics of the system and is measured along axis M (28, FIG. 1) by a suitable nutation sensor 50 such as a horizon sensor, a gyroscope, or an accelerometer of conventional form well known in the art. The electrical signals representing the two components ($\theta_p$ and $\mu$) of $\theta_E$ are included in the closed loop control of FIG. 1 by paths 44, and 46 for processing the nutation quantity $\mu$ and the pitch error $\theta_p$.

The nutation quantity $\mu$ is amplified through a suitable amplifier 50, the output being coupled through a phase shift network 52 whose output is $\mu'$. The two components ($\theta_p$ and $\mu'$) are combined to form $\theta_E$ at a summing junction 54 suitably a resistive network provided at the input to the pitch compensation amplifier 62.

It should be understood, that portion 34 of the pitch loop illustrated in FIG. 2 is merely an analytical schematic showing the action that occurs when a torque T is developed by motor 38. In the practice, a mere change in speed of the motor 38 causes the rotation of the pitch axis 16 to change the sensed pitch error $\theta_p$. The pitch error $\theta_p$ is measured by a suitable pitch attitude sensor 58 which converts the pitch error to suitable electrical form in a manner well known in the art of attitude control. Such a sensor may be a horizon scanner error detector operating to sense any departure from a reference attitude orientation.

The pitch compensation amplifier 62 serves to alter the combined signal $\theta_E$ for pitch loop stability purposes in a manner well known in the art of pitch loop control. The shaped output of the amplifier 62 is then applied to power amplifier 36 which develops a voltage suitable to operate the motor 38. Motor 38 may be powered by alternating current or direct current excitation. The power amplifier 36 depends upon its electrical power needs from the power subsystem of the spacecraft converted to whatever form that may be necessary to operate the motor, the motion sensor, and the other components of the system. Such power arrangements are well known in the art and need not be described in any detail herein.

The phase shifting network 52 according to the present invention is arranged to shift the phase of the nutation sensor 50 via the amplifier 51 by the required electrical phase shift defined by the difference of $\lambda - \lambda_o$, described above. The angular difference determined by this relationship, represents the angular displacement or difference of the axis of the sensor and the optimum axis for achieving maximum nutation damping. The phase shifting network 52 may assume any suitable form such as an operational amplifier arranged to provide the phase shift required or any other suitable network or amplifier known in the art.

It should be understood that although the embodiment of the invention is described with the use of two separate sensors for the pitch error 58 and the nutation motion 50, a single integral transducer may be used to provide the two signals, such as a gyroscope, or a star sensor. Also, two signals can be derived from a horizon sensor which developes a complex signal representing both pitch error and nutation. A suitable filter network may be arranged to separate the two signals from such a transducer.

In operation, the nutation damping system according to the invention attenuates nutation motion substantially to zero at a rate substantially proportional to the magnitude of the cross product of inertia $I_{pr}$. The rate of damping is also substantially proportional to the gain of the amplifier A (51). Regardless of the orientation of the sensor, a phase shifting network will provide the necessary correction or shift of the signal of the nutation sensor to optimize the angle $\lambda$ to $\lambda_o$ to thereby achieve maximum nutation damping.

What is claimed is:

1. A method of stabilizing an orbiting spacecraft of the dual-spin type having a spin axis and a characteristic nutation frequency, and further having a platform de-spun from a motor-driven spinning wheel, said wheel spinning about the spin axis of the spacecraft, said spin axis being common to said platform and said wheel, a control loop including a motor for driving said wheel and further including a first sensor and a second sensor, said first sensor oriented to sense motion of said spacecraft about a given lateral axis with respect to said spin axis, and said second sensor oriented to sense rotation of the platform of the spacecraft, about the spin axis comprising the steps of:

a. adjusting the distribution of the mass of the spacecraft so that cross products of inertia exist between at least one of the lateral axes and the spinning axis, b. sensing by said first sensor the lateral motion of the spacecraft about one of said lateral axes,
c. generating a signal corresponding to the sensed lateral motion having a cyclic component at nutation frequency for controlling the torque from the motor driving the spinning wheel;
d. delaying the cyclic component of the generated signal by said first sensor at the nutation frequency of said spacecraft by an amount such that the signal from said first sensor is shifted in phase by an angle such that the first sensor signal is equivalent to a sensor signal of a sensor located on a lateral axis wherein substantially optimum nutation damping is achieved, and
e. applying the delayed signal to said control loop to control the torque of said spinning wheel.

2. An attitude stabilized dual-spin spacecraft having a characteristic nutation frequency comprising:
a. a de-spun stable platform and a spinning member spinning about a non-principal axis of the platform whereby cross products of inertia about said axis exist,
b. sensor means responsive to lateral motion about a lateral axis for producing a first signal representative of said motion, said first signal having a cyclic component at nutation frequency, and said sensor means being further responsive to errors in pitch angle from the spinning axis for producing a second signal representative of pitch error;
c. a closed loop control circuit including a motor for spinning said member;
d. means included in said closed loop control circuit responsive to said first signal and said second signal for varying the speed of said motor to attenuate said lateral motion and pitch error towards zero; and
e. means for delaying said component of said first sensor signal cyclic at the nutation frequency by an amount whereby the cyclic component of said first signal from the actual transverse axis of said sensor is shifted in phase by an angle such that the first sensor signal is equivalent to a sensor signal of a sensor located on a transverse axis wherein substantially optimum nutation damping is achieved.

3. The spacecraft of claim 2 wherein said sensor means includes one or more rate gyroscopes.

4. The spacecraft of claim 2 wherein said sensor means includes one or more accelerometers.

5. The spacecraft of claim 1 wherein said delaying means comprises an operational amplifier adapted to receive the first signal of said sensor means and to develop an output for controlling said motor in said closed loop control circuit.

6. The spacecraft of claim 2 wherein said delaying means comprises a phase shift network.

* * * * *

UNITED STATES PATENT OFFICE
CERTIFICATE OF CORRECTION

Patent No. 3,830,447        Dated August 20, 1974

Inventor(s)   Kevin John Phillips

It is certified that error appears in the above-identified patent and that said Letters Patent are hereby corrected as shown below:
Column 3, line 18 insert "axis" after --rotation--;
Column 6, line 21 delete "as" second occurrence;
Column 6, line 26 "$\epsilon$" should be "$\xi$";
Column 6, line 31 "$\epsilon$" should be "$\xi$".

Signed and sealed this 3rd day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,830,447

DATED : August 20, 1974

INVENTOR(S) : Kevin John Phillips

It is certified that error appears in the above-identified patent and that said Letters Patent are hereby corrected as shown below:

In the drawing: Figure 1, axis "28" should be labeled --PRODUCT OF INERTIA (Ipr) AXIS--; axis "24" should read --SENSOR AXIS--.
In the text: column 6, line 13 "ε" should read --ξ--; column 6, line 25 "θ" should read --26--; column 6, line 26 "(26)ε" should read --30--; column 6, lines 27 and 32 "θ(30)" should read respectively --26--; column 6, line 31 "ε(26)" should read --30--; column 7, line 47 "M(28, Figure 1)" should read --L(24, Figure 1)--; column 10, line 22 "Claim 1" should read --Claim 2--.

Signed and Sealed this tenth Day of February 1976

[SEAL]

Attest:

RUTH C. MASON
*Attesting Officer*

C. MARSHALL DANN
*Commissioner of Patents and Trademarks*